(12) United States Patent
Kato et al.

(10) Patent No.: US 9,106,359 B2
(45) Date of Patent: Aug. 11, 2015

(54) OPTICAL NETWORK SYSTEM, OPTICAL MULTIPLEXING APPARATUS, AND RECEIVING APPARATUS

(75) Inventors: Tomoyuki Kato, Kawasaki (JP); Shigeki Watanabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 473 days.

(21) Appl. No.: 13/067,283

(22) Filed: May 20, 2011

(65) Prior Publication Data

US 2012/0051743 A1 Mar. 1, 2012

(30) Foreign Application Priority Data

Aug. 30, 2010 (JP) .................................. 2010-191694

(51) Int. Cl.
| | | |
|---|---|---|
| *H04J 14/00* | (2006.01) | |
| *H04J 14/02* | (2006.01) | |
| *H04B 10/61* | (2013.01) | |
| *H04B 10/00* | (2013.01) | |
| *H04J 14/08* | (2006.01) | |
| *G02F 1/35* | (2006.01) | |

(52) U.S. Cl.
CPC ................. *H04J 14/02* (2013.01); *G02F 1/353* (2013.01); *G02F 1/3515* (2013.01); *H04B 10/12* (2013.01); *H04B 10/61* (2013.01); *H04J 14/0298* (2013.01); *H04J 14/08* (2013.01)

(58) Field of Classification Search
CPC ....... H04J 14/02; H04J 14/0298; H04J 14/08; H04B 10/12; H04B 10/61
USPC ............... 398/43, 52, 76–79, 89, 91–95, 187, 398/202–214; 385/11, 16, 122
See application file for complete search history.

(56) References Cited

U.S. PATENT DOCUMENTS

| | | | | |
|---|---|---|---|---|
| 5,432,632 | A | * | 7/1995 | Watanabe ........................ 398/76 |
| 5,530,584 | A | | 6/1996 | Myslinski |
| 5,596,436 | A | * | 1/1997 | Sargis et al. ..................... 398/76 |
| 5,596,667 | A | * | 1/1997 | Watanabe ...................... 385/122 |
| 6,049,642 | A | * | 4/2000 | Nakamura et al. .............. 385/16 |
| 6,101,024 | A | | 8/2000 | Islam |
| 6,222,658 | B1 | * | 4/2001 | Dishman et al. .............. 398/205 |

(Continued)

FOREIGN PATENT DOCUMENTS

| | | |
|---|---|---|
| EP | 0836112 A2 | 4/1998 |
| EP | 1389742 | 2/2004 |

(Continued)

OTHER PUBLICATIONS

European Extended Search Report mailed Mar. 18, 2013 in corresponding Patent Application No. 11168205.0.

(Continued)

*Primary Examiner* — Li Liu
(74) *Attorney, Agent, or Firm* — Staas & Halsey LLP

(57) ABSTRACT

In an optical network system a carrier light propagates along a transmission line. A control light generator included in an optical multiplexing apparatus generates a control light obtained by modulating an intensity-modulated light by a data signal. A multiplexer combines the control light with the carrier light for modulating the carrier light in a nonlinear optical medium in the transmission line by the control light. The carrier light which propagates along the transmission line is modulated in the nonlinear optical medium on the basis of the control light.

8 Claims, 12 Drawing Sheets

(56) References Cited

U.S. PATENT DOCUMENTS

| | | | |
|---|---|---|---|
| 6,407,843 B1* | 6/2002 | Rowan et al. | 398/202 |
| 6,522,818 B1* | 2/2003 | Aso et al. | 385/122 |
| 6,529,314 B1 | 3/2003 | Shukunami et al. | |
| 6,529,315 B2 | 3/2003 | Bartolini et al. | |
| 6,771,864 B2 | 8/2004 | Kubo et al. | |
| 6,922,503 B2 | 7/2005 | Hasegawa | |
| 6,959,135 B1 | 10/2005 | Bickham | |
| 7,292,792 B2 | 11/2007 | Chen et al. | |
| 7,343,065 B2* | 3/2008 | Maeda | 385/24 |
| 7,526,211 B2* | 4/2009 | Mcnicol et al. | 398/204 |
| 2002/0041435 A1 | 4/2002 | Krummrich | |
| 2002/0057880 A1 | 5/2002 | Hirano et al. | |
| 2002/0114061 A1 | 8/2002 | Naito et al. | |
| 2002/0176183 A1 | 11/2002 | Erz | |
| 2004/0005153 A1 | 1/2004 | Watanabe | |
| 2004/0066550 A1 | 4/2004 | Jay | |
| 2004/0190909 A1* | 9/2004 | Akasaka et al. | 398/173 |
| 2005/0111499 A1 | 5/2005 | Tanaka | |
| 2006/0045445 A1 | 3/2006 | Watanabe | |
| 2006/0051100 A1 | 3/2006 | Watanabe | |
| 2008/0080856 A1 | 4/2008 | Kagawa | |
| 2008/0298813 A1 | 12/2008 | Song et al. | |
| 2010/0021105 A1* | 1/2010 | Watanabe | 385/11 |
| 2010/0183303 A1* | 7/2010 | Okabe et al. | 398/52 |
| 2010/0254649 A1* | 10/2010 | Schofield | 385/11 |

FOREIGN PATENT DOCUMENTS

| | | | |
|---|---|---|---|
| EP | 1633066 A2 | 3/2006 | |
| EP | 1830224 | 9/2007 | |
| EP | 2199846 A1 | 6/2010 | |
| JP | 08-029817 | 2/1996 | |
| JP | 2001-031901 | 1/2000 | |
| JP | 2000-049703 | 2/2000 | |
| JP | 2001-183711 | 7/2001 | |
| JP | 3436310 | 6/2003 | |
| JP | 2006-184851 | 7/2006 | |
| JP | 2007-047828 | 2/2007 | |
| JP | 2007-133426 | 5/2007 | |
| WO | WO 94/09403 | 4/1994 | |
| WO | WO 2009/047856 | * 4/2009 | G02F 1/01 |

OTHER PUBLICATIONS

Patent Abstracts of Japan provided by the European Patent Office, Publication No. 2001-183711, Published Jul. 6, 2001.

Japanese Office Action dated Jan. 14, 2014 in corresponding Japanese Patent Application No. 2010-191694 (2 pages) (2 pages English Translation).

Notice of Allowance mailed Jun. 6, 2014 in related U.S. Appl. No. 13/173,230 (20 pages).

Non-Final Office Action dated Aug. 5, 2014 in related U.S. Appl. No. 13/431,710 (16 pages).

Extended European Search Report mailed May 22, 2013 for corresponding European Application No. 09850854.2 (8 pages).

S. Watanabe et al., "*Simultaneous Wavelength Conversion and Optical Phase Conjugation of 200 Gb/s (5x40 Gb/s) WDM Signal Using a Highly Nonlinear Fiber Four-wave Mixer*", ICOC-ECOC, vol. 5, Sep. 22-25, 1997, 11$^{th}$ International Conference on Integrated Optics and Optical Fibre Communications/23$^{rd}$ European Conference on Optical Communications, IEEE Conference Publication XP006508700, ISBN: 978-0-85296-697-6, pp. 1-4.

D.M. Forin et al., "*Ultrawide bandwidth Λ—converter with regeneration properties based on cross phase modulation effect in highly non linear dispersion flattened fiber*", Optical Fiber Communication (OFC 2007), Collocated National Fiber Optic Engineers Conference, Mar. 25-29, 2007, XP031146401, ISBN: 978-1-55752-831-5, 3 pp.

G. Contestabile et al., "*Double-Stage Cross-Grain Modulation in SOAs: An Effective Technique for WDM Multicasting*", IEEE Photonics Technology Letters, vol. 18, No. 1, Jan. 1, 2006, XP55062719, ISSN: 1041-1135, DOI: 10.1109/LPT.2005.861626, pp. 181-183.

International Search Report dated Dec. 22, 2009 in Application No. PCT/JP2009/068703 (4 pages).

"*A new high bit rate orthogonal IM/FSK scheme based on an all fiber realization, for AOLS applications*", Skarmoutsos et al., ECOC Proceedings, 2005.09, vol. 3, pp. 683-684.

"*All-Optical Label Swapping Networks and Technologies*", Blumenthal et al., Journal of Lightwave Technology, 2000.12, vol. 18, No. 12, pp. 2058-2075.

Extended European Search Report, mailed May 18, 2009 in corresponding European Patent Application No. 08164874.3 (5 pp.).

Notice of Allowance mailed Sep. 26, 2011 in related U.S. Appl. No. 12/232,684 (5 pages).

Office Action mailed Mar. 4, 2011 in related U.S. Appl. No. 12/232,684 (33 pages).

Office Action mailed Dec. 22, 2010 in related U.S. Appl. No. 12/232,684 (5 pages).

Notice of Allowance mailed May 21, 2012 in related U.S. Appl. No. 12/232,684 (7 pages).

Office Action dated Apr. 21, 2014 in related U.S. Appl. No. 13/431,710 (10 pages).

U.S. Appl. No. 13/431,710, filed Mar. 27, 2012, Shigeki Watanabe, Fujitsu Limited Kawasaki-shi, Japan.

U.S. Appl. No. 12/232,684, filed Sep. 22, 2008, Shigeki Watanabe, Fujitsu Limited Kawasaki-shi, Japan.

U.S. Appl. No. 13/173,230, filed Jun. 30, 2011, Shigeki Watanabe, Fujitsu Limited Kawasaki-shi, Japan.

Notice of Allowance mailed Nov. 10, 2014 in related U.S. Appl. No. 13/431,710 (10 pages).

U.S. Appl. No. 13/431,710, Mar. 27, 2012, Shigeki Watanabe, Fujitsu Limited Kawasaki-shi, Japan.

U.S. Appl. No. 12/232,684, Sep. 22, 2008, Shigeki Watanabe, Fujitsu Limited Kawasaki-shi, Japan.

U.S. Appl. No. 13/173,230, Jun. 30, 2011, Shigeki Watanabe, Fujitsu Limited Kawasaki-shi, Japan.

* cited by examiner

OPTICAL NETWORK SYSTEM, OPTICAL MULTIPLEXING APPARATUS, AND RECEIVING APPARATUS

CROSS-REFERENCE TO RELATED APPLICATION

This application is based upon and claims the benefit of priority of the prior Japanese Patent Application No. 2010-191694, filed on Aug. 30, 2010, the entire contents of which are incorporated herein by reference.

FIELD

The embodiments discussed herein are related to an optical network system and an optical multiplexing apparatus for combining information on a carrier light, and a receiving apparatus.

BACKGROUND

Traditionally, WDM (Wavelength Division Multiplexing) is known as a technique for optical multiplex transmission of information. With WDM it is possible to multiplex optical signals with different wavelengths and transmit plural pieces of information by one optical fiber.

Formerly the following relay station using a phase conjugate light was proposed. The relay station is located between a sending station and a receiving station and is connected to them via an optical transmission line. The relay station includes a phase conjugate light generator including a signal light and excitation light supply section which supplies an input signal light from the sending station and an excitation light to a nonlinear optical medium and a signal light and phase conjugate light extraction section which extracts an output signal light and a phase conjugate light generated by the input signal light and the excitation light supplied to the nonlinear optical medium and a modulator which modulates the excitation light by monitor data specific to the relay station. The relay station transmits a modulated phase conjugate light including the monitor data to the receiving station (see, for example, Japanese Patent No. 3436310).

With WDM, however, there is a limit to accuracy in setting wavelength for a signal light or the resolution of an optical multiplexer and demultiplexer. As a result, it is difficult to realize high density multiplexing. Accordingly, there is a limit to the number of optical signals which can be multiplexed.

SUMMARY

According to an aspect of the present invention, an optical network system includes a transmission line along which a carrier light propagates and an optical multiplexing apparatus placed in the transmission line, the optical multiplexing apparatus including a control light generator which generates a control light obtained by modulating an intensity-modulated light by a data signal and a multiplexer which combines the control light with the carrier light for modulating the carrier light in a nonlinear optical medium in the transmission line by the control light.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
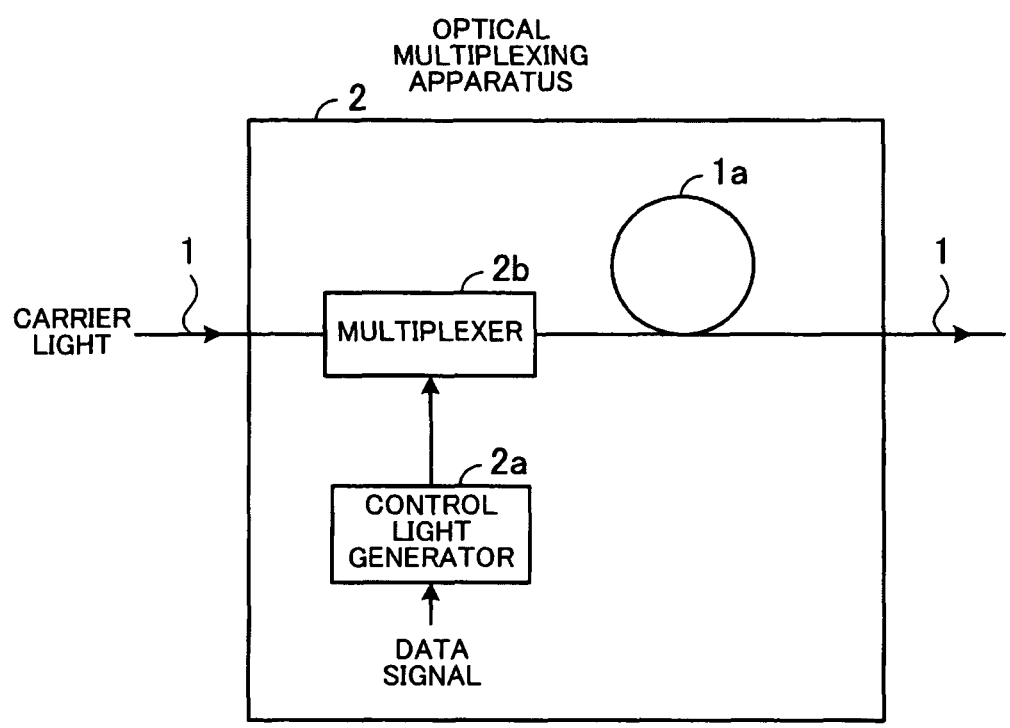
FIG. 1 illustrates an optical network system according to a first embodiment.

Embodiments will now be described in detail with reference to the accompanying drawings, wherein like reference numerals refer to like elements throughout.

(First Embodiment)

FIG. 1 illustrates an optical network system according to a first embodiment. As illustrated in FIG. 1, an optical network system includes a transmission line 1 and an optical multiplexing apparatus 2. The optical multiplexing apparatus 2 includes a control light generator 2a and a multiplexer 2b.

A carrier light propagates along the transmission line 1. A carrier light is, for example, a CW (Continuous Wave) light.

The control light generator 2a generates a control light obtained by modulating an intensity-modulated light by a data signal. For example, the control light generator 2a combines two lights at different optical frequencies and generates a beat light intensity-modulated at a frequency corresponding to the difference between the two optical frequencies. The control light generator 2a then generates a control light by intensity-modulating the generated beat light by a data signal.

The multiplexer 2b combines the control light with the carrier light in order to modulate the carrier light in a nonlinear optical medium 1a in the transmission line 1 by the control light. The nonlinear optical medium 1a is, for example, an optical fiber used as the transmission line 1. The carrier light which propagates along the transmission line 1 is all-optical modulated in the nonlinear optical medium 1a on the basis of, for example, the control light. For example, the multiplexer 2b may be a WDM coupler, a power coupler, or an Array Waveguide Grating (AWG).

As stated above, the optical network system modulates an intensity-modulated light by a data signal to generate a control light. The optical network system then modulates a carrier light which propagates along the transmission line 1 by the control light generated. As a result, the carrier light can multiplex-transmit information in high density on the basis of control lights.

(Second Embodiment)

A second embodiment will now be described in detail with reference to the drawings.

Figure 2:
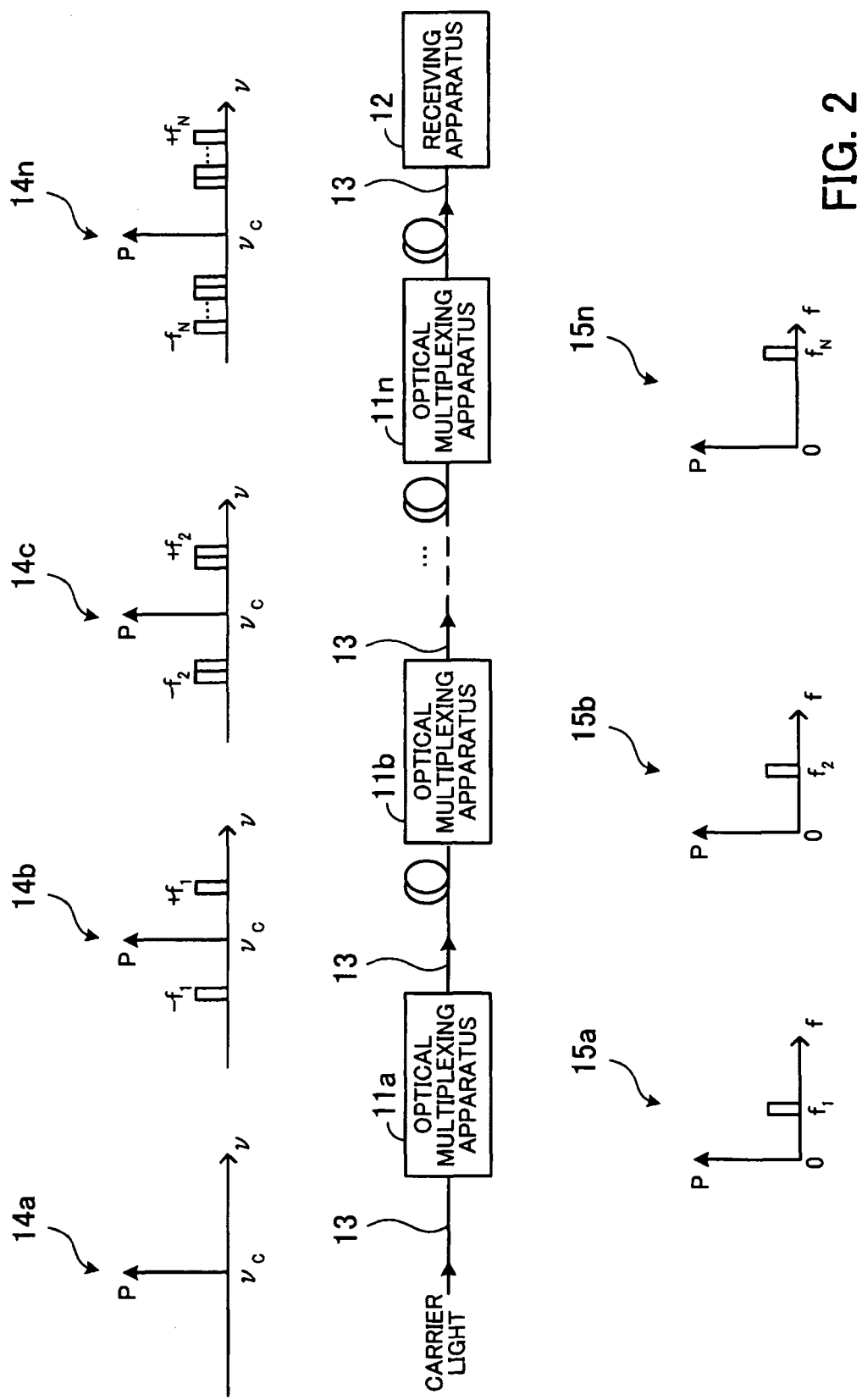
FIG. 2 illustrates an optical network system according to a second embodiment.

FIG. 2 illustrates an optical network system according to a second embodiment. As illustrated in FIG. 2, an optical network system includes optical multiplexing apparatus $11a$, $11b$, ..., and $11n$, a receiving apparatus 12, and a transmission line 13. The optical multiplexing apparatus $11a$, $11b$, ..., and $11n$ and the receiving apparatus 12 are placed in the transmission line 13. The transmission line 13 is, for example, a nonlinear optical medium such as an optical fiber.

A carrier light propagates along the transmission line 13. The carrier light is a CW light. Alternatively, the carrier light is a baseband modulated signal light modulated at a bit rate which is sufficiently low compared with the beat frequencies of control lights combined with the carrier light by the optical multiplexing apparatus $11a$, $11b$, ..., and $11n$.

For example, a data signal to be transmitted by the carrier light is transmitted from an apparatus (not illustrated) to the optical multiplexing apparatus $11a$, $11b$, ..., and $11n$. This data signal is transmitted as, for example, an electrical signal. The optical multiplexing apparatus $11a$, $11b$, ..., and $11n$ generate lights at different beat frequencies, modulate the generated lights by the data signal transmitted, and generates control lights. The optical multiplexing apparatus $11a$, $11b$, ..., and $11n$ combine the control lights obtained by modulating the generated lights by the data signal with the carrier light.

The carrier light is modulated according to the optical intensity of a control light combined therewith. For example, the carrier light is all-optical modulated by the nonlinear optical medium according to the optical intensity of a control light.

The receiving apparatus 12 receives the carrier light which propagates along the transmission line 13, performs a demodulation process, and acquires a data signal transmitted from each of the optical multiplexing apparatus $11a$, $11b$, ..., and $11n$.

FIG. 2 illustrates optical spectra $14a$, $14b$, $14c$, and $14n$ of the carrier light which propagates along the transmission line 13. The horizontal axis and vertical axis of the optical spectra indicate an optical frequency and power respectively. In addition, FIG. 2 illustrates electrical spectra $15a$, $15b$, and $15n$ of the control lights combined with the carrier light by the optical multiplexing apparatus $11a$, $11b$, and $11n$ respectively. The horizontal axis and vertical axis of the electrical spectra indicate a frequency and power respectively.

$v_c$ indicated in the optical spectra is the optical frequency of the carrier light which propagates along the transmission line 13. $f_1$, $f_2$, and $f_N$ indicated in the electrical spectra are the beat frequencies of the control lights generated by the optical multiplexing apparatus $11a$, $11b$, and $11n$ respectively.

The carrier light is modulated according to the optical intensity of a control light combined therewith. As a result, the optical spectra $14b$, $14c$, and $14n$ illustrated in FIG. 2 are obtained as optical spectra of the carrier light which propagates along the transmission line 13.

That is to say, with the optical network system illustrated in FIG. 2, the optical multiplexing apparatus $11a$, $11b$, ..., and $11n$ generate lights at different beat frequencies, and combine them by a data signal, and combine them with a carrier light (hereinafter also referred to as frequency division multiplexing). This makes it possible to combine each control light with the carrier light without exercising relative wavelength control between them with great accuracy.

Figure 3:
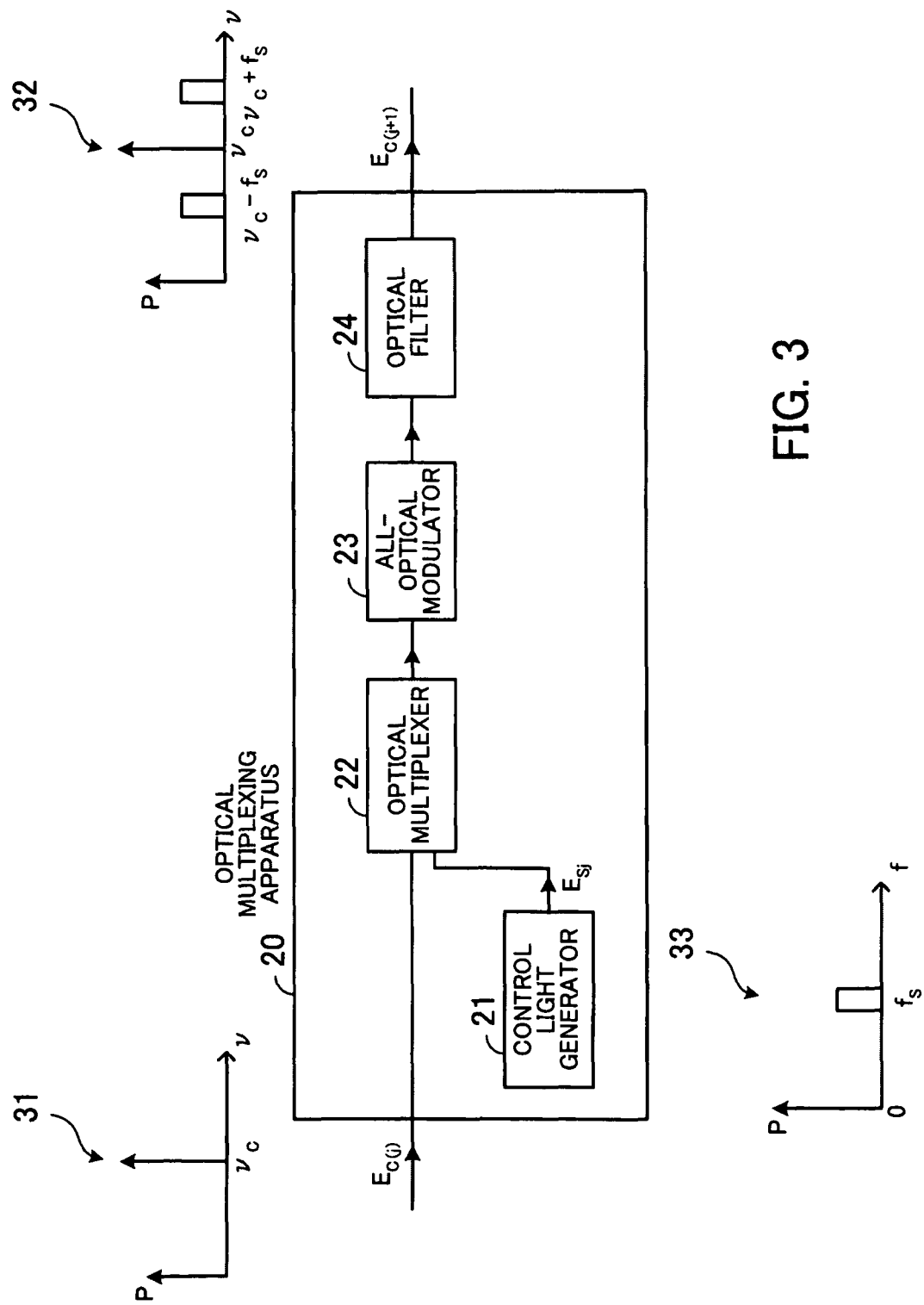
FIG. 3 is a block diagram of an optical multiplexing apparatus.

FIG. 3 is a block diagram of an optical multiplexing apparatus. As illustrated in FIG. 3, an optical multiplexing apparatus 20 includes a control light generator 21, an optical multiplexer 22, an all-optical modulator 23, and an optical filter 24. The optical multiplexing apparatus 20 is placed in a transmission line. A carrier light $E_{c(j)}$ propagates along the transmission line.

An optical spectrum 31 of the carrier light $E_{c(j)}$ is illustrated in FIG. 3. The optical multiplexing apparatus 20 combines a control light with the carrier light $E_{c(j)}$. As a result, a carrier light $E_{c(j+1)}$ is obtained. An optical spectrum 32 of the carrier light $E_{c(j+1)}$ is also illustrated in FIG. 3. In addition, an electrical spectrum 33 of a control light $E_{sj}$ outputted by the control light generator 21 is illustrated in FIG. 3. The horizontal axis and vertical axis of each of the optical spectra 31 and 32 indicate an optical frequency and power respectively. The horizontal axis and vertical axis of the electrical spectrum 33 indicate a frequency and power respectively.

$v_c$ of FIG. 3 indicates the optical frequency of the carrier light $E_c$. A frequency $f_s$ indicates the beat frequency of the control light. "j" in FIG. 3 indicates that the optical multiplexing apparatus 20 combines the control light with the carrier light jth in an optical network system.

The control light generator 21 generates a light intensity-modulated at the frequency $f_s$ (light the intensity of which changes periodically at the frequency $f_s$ for example). Hereinafter the frequency $f_s$ may be referred to as the optical subcarrier frequency and the light intensity-modulated at the frequency $f_s$ may be referred to as the subcarrier light.

A data signal (not illustrated) to be transmitted by, for example, the carrier light $E_{c(j)}$ is inputted to the control light generator 21. The control light generator 21 generates the control light $E_{sj}$ obtained by modulating the subcarrier light generated by the data signal. Hereinafter the control light $E_{sj}$ may be referred to as the optical subcarrier modulated signal.

The optical multiplexer 22 combines the carrier light $E_{c(j)}$ which propagates along the transmission line and the optical subcarrier modulated signal generated by the control light generator 21. For example, the optical multiplexer 22 may be a WDM coupler, a power coupler, or an Array Waveguide Grating (AWG).

The carrier light $E_{c(j)}$ and the optical subcarrier modulated signal combined are inputted to the all-optical modulator 23. The all-optical modulator 23 uses a nonlinear optical medium for all-optical modulating the carrier light $E_{c(j)}$ on the basis of the optical subcarrier modulated signal, and combines the optical subcarrier modulated signal with the carrier light $E_{c(j)}$.

Optical phase modulation based on cross phase modulation, optical intensity modulation based on an optical parametric effect, or the like can be used as all-optical modulation by a nonlinear optical medium. An optical fiber, periodically poled lithium niobate, a semiconductor optical amplifier, an optical waveguide with a high refractive index contrast, such as a silicon wire waveguide, or the like can be used as a nonlinear optical medium. An optical fiber used as a transmission line may be used for all-optical modulating the carrier light $E_{c(j)}$ on the basis of the optical subcarrier modulated signal.

The optical filter 24 allows a light the wavelength of which is $\lambda_c$ to pass. $\lambda_c$ is the wavelength of the carrier light $E_{c(j)}$. That is to say, the optical filter rejects the control light combined with the carrier light $E_{c(j)}$ by the optical multiplexer 22 from propagating to the next stage.

Figure 4:
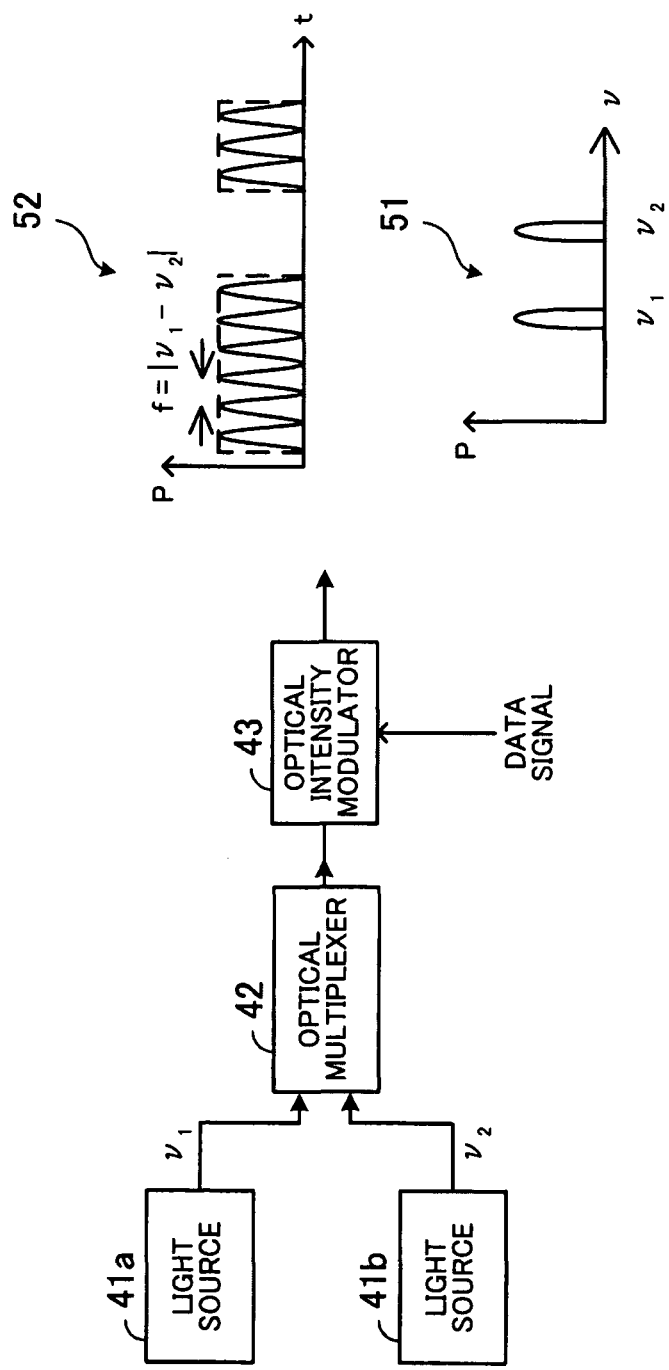
FIG. 4 is a block diagram of a control light generator.

FIG. 4 is a block diagram of the control light generator. As illustrated in FIG. 4, the control light generator includes light sources 41a and 41b, an optical multiplexer 42, and an optical intensity modulator 43.

An optical spectrum 51 of the optical subcarrier modulated signal outputted from the optical intensity modulator 43 is illustrated in FIG. 4. The horizontal axis and vertical axis of the optical spectrum 51 indicate an optical frequency and power respectively. In addition, a waveform 52 of the optical subcarrier modulated signal outputted from the optical intensity modulator 43 is illustrated in FIG. 4. The horizontal axis and vertical axis of the waveform 52 indicate time and power respectively.

The light sources 41a and 41b output CW lights at different optical frequencies $v_1$ and $v_2$.

The optical multiplexer 42 combines the lights outputted from the light sources 41a and 41b. As a result, a subcarrier light is outputted from the optical multiplexer 42. The subcarrier light has a beat frequency given by $$f=|v_1-v_2| \quad (1)$$

That is to say, a beat light (subcarrier light) had sinusoidal intensity at a frequency corresponding to the difference between the optical frequencies of the lights outputted from the light sources 41a and 41b is outputted from the optical multiplexer 42. As indicated by a solid line of the waveform 52, for example, a subcarrier light at the frequency f is outputted from the optical multiplexer 42. For example, the optical multiplexer 42 may be a WDM coupler, a power coupler, or an Array Waveguide Grating (AWG).

A data signal to be transmitted via a transmission line is transmitted from an apparatus (not illustrated) to the optical intensity modulator 43. The data signal is, for example, an electrical signal. The optical intensity modulator 43 intensity-modulates the subcarrier light outputted from the optical multiplexer 42 by the data signal, and outputs an optical subcarrier modulated signal.

For example, the optical intensity modulator 43 outputs an optical subcarrier modulated signal like that indicated by a solid line of the waveform 52. A dashed line of the waveform 52 indicates the waveform of the data signal transmitted to the optical intensity modulator 43. The optical spectrum 51 is an optical spectrum of this optical subcarrier modulated signal.

The optical subcarrier modulated signal outputted from the optical intensity modulator 43 is inputted to, for example, the optical multiplexer 22 illustrated in FIG. 3, and is combined with a carrier light. The optical subcarrier modulated signal is controlled so that the optical subcarrier modulated signal and the carrier light will have the same state of polarization. The optical subcarrier modulated signal is then combined with the carrier light.

The optical intensity modulator 43 is, for example, a lithium niobate optical modulator or an EA (Electro-Absorption) modulator. Alternatively, the optical intensity modulator 43 is a nonlinear optical medium such as an optical fiber, periodically poled lithium niobate, a semiconductor optical amplifier, or a silicon wire waveguide. If the optical intensity modulator 43 is a nonlinear optical medium, then the optical intensity modulator 43 E/O-converts the data signal transmitted thereto, and intensity-modulates the subcarrier light outputted from the optical multiplexer 42 by the E/O-converted data signal. If the data signal transmitted to the optical intensity modulator 43 is an optical signal, then the optical intensity modulator 43 inputs it directly to a nonlinear optical medium and intensity-modulates the subcarrier light.

As has been described, the optical network system generates a beat light (subcarrier light), modulates the subcarrier light by a data signal, and generates an optical subcarrier modulated signal. The optical network system then modulates a carrier light which propagates along the transmission line by the generated optical subcarrier modulated signal. As a result, the carrier light can transmit the data signal by wide-band modulation based on the optical intensity of the optical subcarrier modulated signal.

As indicated in the optical spectrum 14n of FIG. 2, for example, frequency division multiplexing is performed. Therefore, a terahertz-level wide band can be secured.

Furthermore, it is possible to generate a subcarrier signal which is an electrical signal, modulate the subcarrier signal by a data signal, and generate a control light by the use of the subcarrier signal which is an electrical signal and which is modulated by the data signal. In this case, however, a high-frequency oscillator for high frequencies is necessary and wide-band frequency division multiplexing is difficult. With the control light generator illustrated in FIG. 4, on the other hand, a beat light is generated by controlling the optical frequencies of lights outputted from the two light sources, and is modulated by a data signal. This enables wide-band frequency division multiplexing.

(Third Embodiment)

A third embodiment will now be described in detail with reference to the drawing. The third embodiment differs from the second embodiment in the structure of a control light generator. An optical network system according to the third embodiment is the same as that illustrated in FIG. 2, and its description will be omitted. In addition, an optical multiplexing apparatus is the same as that illustrated in FIG. 3 (but differs in the structure of the control light generator), and its description will be omitted.

Figure 5:
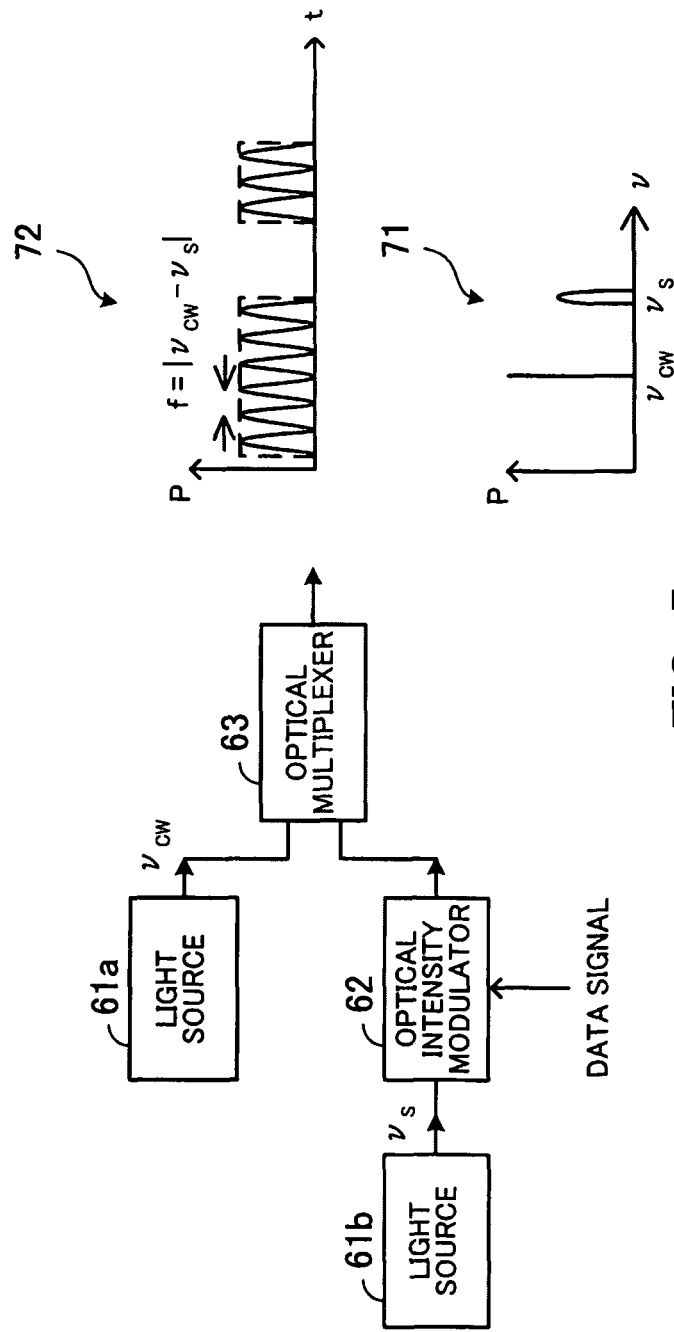
FIG. 5 is a block diagram of a control light generator according to a third embodiment.

FIG. 5 is a block diagram of the control light generator according to the third embodiment. As illustrated in FIG. 5, the control light generator includes light sources 61a and 61b, an optical intensity modulator 62, and an optical multiplexer 63.

An optical spectrum 71 of an optical subcarrier modulated signal outputted from the optical multiplexer 63 is illustrated in FIG. 5. The horizontal axis and vertical axis of the optical spectrum 71 indicate an optical frequency and power respectively. In addition, a waveform 72 of the optical subcarrier modulated signal outputted from the optical multiplexer 63 is illustrated in FIG. 5.

The horizontal axis and vertical axis of the waveform 72 indicate time and power respectively.

The light sources 61a and 61b output CW lights at different optical frequencies $v_{cw}$ and $v_s$.

A data signal to be transmitted via a transmission line is transmitted from an apparatus (not illustrated) to the optical intensity modulator 62. The optical intensity modulator 62 intensity-modulates the light outputted from the light source 61b by the data signal, and outputs the intensity-modulated light to the optical multiplexer 63.

The optical intensity modulator 62 is, for example, a lithium niobate optical modulator or an EA modulator. Alternatively, the optical intensity modulator 62 is a nonlinear optical medium. If the optical intensity modulator 62 is a nonlinear optical medium, then the optical intensity modulator 62 E/O-converts the data signal transmitted thereto, and intensity-modulates the light outputted from the light source 61b by the E/O-converted data signal. If the data signal transmitted to the optical intensity modulator 62 is an optical signal, then the optical intensity modulator 62 inputs it directly to the nonlinear optical medium and intensity-modulates the light outputted from the light source 61b.

The optical multiplexer 63 combines the light outputted from the light source 61a and the light outputted from the optical intensity modulator 62. An optical spectrum of the light outputted from the optical multiplexer 63 is indicated by the optical spectrum 71. The light outputted from the light source 61a and the light outputted from the optical intensity modulator 62 are combined and the optical subcarrier modulated signal is outputted from the optical multiplexer 63. The optical subcarrier frequency of the optical subcarrier modulated signal is given by $$f=|v_{cw}-v_s| \quad (2)$$

That is to say, a subcarrier light intensity-modulated at a frequency corresponding to the difference between the optical frequencies of the lights outputted from the light sources 61a and 61b is intensity-modulated by the data signal and the optical subcarrier modulated signal obtained is outputted from the optical multiplexer 63. For example, the optical multiplexer 22 may be a WDM coupler, a power coupler, or an Array Waveguide Grating (AWG).

For example, the optical multiplexer 63 outputs an optical subcarrier modulated signal like that indicated by a solid line of the waveform 72. A dashed line of the waveform 72 indicates the waveform of the data signal transmitted to the optical intensity modulator 62.

The optical subcarrier modulated signal outputted from the optical multiplexer 63 is inputted to, for example, the optical multiplexer 22 illustrated in FIG. 3, and is combined with a carrier light. The optical subcarrier modulated signal is controlled so that the optical subcarrier modulated signal and the carrier light will have the same state of polarization. The optical subcarrier modulated signal is then combined with the carrier light.

As has been described, the control light generator modulates a light outputted from one light source by a data signal and combines the modulated light with a light outputted from the other light source. By doing so, an optical subcarrier modulated signal can be outputted.

(Fourth Embodiment)

A fourth embodiment will now be described in detail with reference to the drawing. In the second and third embodiments a single optical subcarrier modulated signal is combined with a carrier light. In the fourth embodiment a plurality of optical subcarrier modulated signals which are independent of one another are multiplexed and are combined with a carrier light. An optical network system according to the fourth embodiment is the same as that illustrated in FIG. 2, and its description will be omitted. In addition, an optical multiplexing apparatus is the same as that illustrated in FIG. 3 (but differs in the structure of a control light generator), and its description will be omitted.

Figure 6:
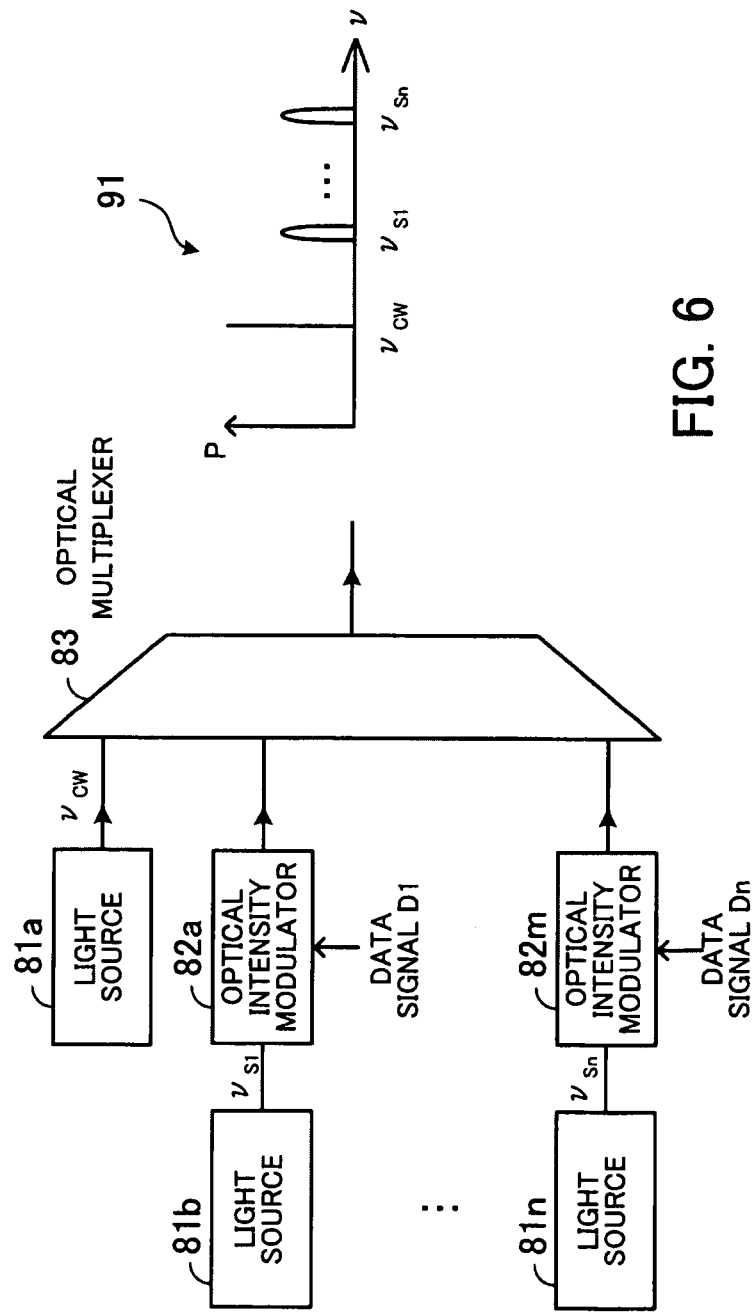
FIG. 6 is a block diagram of a control light generator according to a fourth embodiment.

FIG. 6 is a block diagram of the control light generator according to the fourth embodiment. As illustrated in FIG. 6, the control light generator includes light sources 81a, 81b, ..., and 81n, optical intensity modulators 82a, ..., and 82m, and an optical multiplexer 83.

An optical spectrum 91 of a light outputted from the optical multiplexer 83 is illustrated in FIG. 6. The horizontal axis and vertical axis of the optical spectrum 91 indicate an optical frequency and power respectively.

The light sources 81a, 81b, ..., and 81n output CW lights at different optical frequencies $v_{cw}$, $v_s$, ..., and $v_{sn}$.

Data signal D1, ..., and Dn to be transmitted via a transmission line are transmitted from an apparatus (not illustrated) to the optical intensity modulators 82a, ..., and 82m respectively. For example, the data signal D1, ..., and Dn are transmitted from different apparatus (not illustrated) or one apparatus (not illustrated).

The optical intensity modulator 82a intensity-modulates the light outputted from the light source 81b by the data signal D1 and outputs the intensity-modulated light to the optical multiplexer 83. Similarly, the optical intensity modulator 82m intensity-modulates the light outputted from the light source 81n by the data signal Dn and outputs the intensity-modulated light to the optical multiplexer 83.

Each of the optical intensity modulators 82a, ..., and 82m is, for example, a lithium niobate optical modulator or an EA modulator. Alternatively, each of the optical intensity modulators 82a, ..., and 82m is a nonlinear optical medium. If the optical intensity modulators 82a, ..., and 82m are nonlinear optical media, then the optical intensity modulators 82a, ..., and 82m E/O-convert the data signals transmitted thereto, and intensity-modulate the lights outputted from the light sources 81b, ..., and 81n, respectively, by the E/O-converted data signals. If the data signals transmitted to the optical intensity modulators 82a, ..., and 82m are optical signals, then the optical intensity modulators 82a, ..., and 82m input them directly to the nonlinear optical media and intensity-modulate the lights outputted from the light sources and 81n respectively.

The optical multiplexer 83 combines the light outputted from the light source 81a and lights outputted from the optical intensity modulators 82a, ..., and 82m. An optical spectrum of a light outputted from the optical multiplexer 83 is indicated by the optical spectrum 91. The light outputted from the light source 81a and the lights outputted from the optical intensity modulators 82a, ..., and 82m are combined and n optical subcarrier modulated signals are outputted from the optical multiplexer 83. The optical subcarrier frequencies of the n optical subcarrier modulated signals are given by $$f_j=|v_{cw}-v_{sj}| \quad (3)$$

where j is 1 to n (n is the number of the light sources 81b, ..., and 81n).

That is to say, the optical subcarrier modulated signal obtained by intensity-modulating a subcarrier light sinusoidal-modulated at a frequency corresponding to the difference between the optical frequencies of the lights outputted from the light sources 81a and 81b by the data signal D1 is outputted from the optical multiplexer 83. Similarly, the optical subcarrier modulated signal obtained by intensity-modulating a subcarrier light sinusoidal-modulated at a frequency corresponding to the difference between the optical frequencies of the lights outputted from the light sources 81a and 81n by the data signal Dn is outputted from the optical multiplexer 83. In this case, these optical subcarrier modulated signals are combined and are outputted from the optical multiplexer 83. The optical subcarrier modulated signals outputted from the optical multiplexer 83 are inputted to, for example, the optical multiplexer 22 illustrated in FIG. 3, and are combined with a carrier light. The optical subcarrier modulated signals are controlled so that the optical subcarrier modulated signals and the carrier light will have the same state of polarization. The optical subcarrier modulated signals are then combined with the carrier light.

The instantaneous optical power of the combined optical subcarrier modulated signals is high and crosstalk increases in the nonlinear optical media. Accordingly, for example, an optical dispersive medium may be placed on the output side of the optical multiplexer 83 to pass the optical subcarrier modulated signals outputted from the optical multiplexer 83 through the optical dispersive medium. This can control an increase in crosstalk in the nonlinear optical media.

As has been described, the control light generator includes the plurality of light sources which output lights at different optical frequencies, modulates subcarrier lights obtained on the basis of these lights by the plurality of data signals, and combines optical subcarrier modulated signals obtained. By doing so, the combined optical subcarrier modulated signals can be generated.

(Fifth Embodiment)

A fifth embodiment will now be described in detail with reference to the drawing. In the fifth embodiment a mode-locked laser is used for generating an optical subcarrier modulated signal. An optical network system according to the fifth embodiment is the same as that illustrated in FIG. 2, and its description will be omitted. In addition, an optical multiplexing apparatus is the same as that illustrated in FIG. 3 (but differs in the structure of a control light generator), and its description will be omitted.

Figure 7:
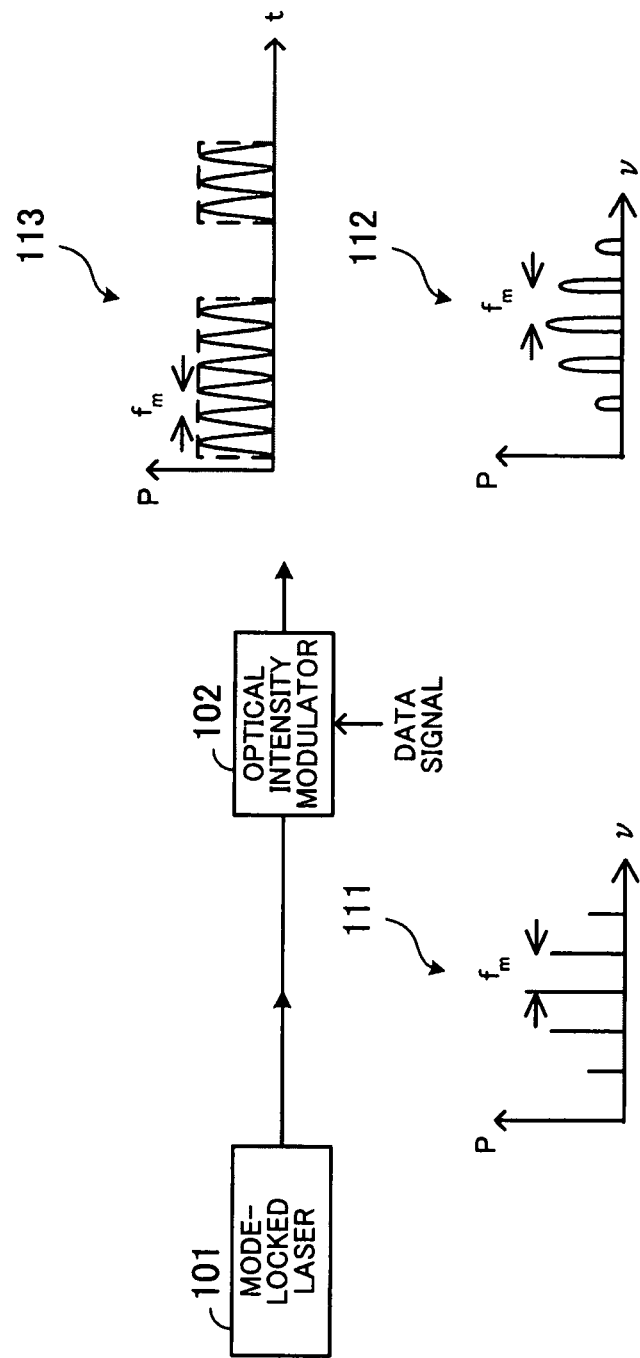
FIG. 7 is a block diagram of a control light generator according to a fifth embodiment.

FIG. 7 is a block diagram of the control light generator according to the fifth embodiment. As illustrated in FIG. 7, the control light generator includes a mode-locked laser 101 and an optical intensity modulator 102.

An optical spectrum 111 of a light outputted from the mode-locked laser 101 is illustrated in FIG. 7. The horizontal axis and vertical axis of the optical spectrum 111 indicate an optical frequency and power respectively. In addition, an optical spectrum 112 of a light outputted from the optical intensity modulator 102 is illustrated in FIG. 7. The horizontal axis and vertical axis of the optical spectrum 112 indicate an optical frequency and power respectively. Furthermore, a waveform 113 of the optical subcarrier modulated signal outputted from the optical intensity modulator 102 is illustrated in FIG. 7. The horizontal axis and vertical axis of the waveform 113 indicate time and power respectively.

A light (subcarrier light) at a repetition frequency $f_m$ indicated in the optical spectrum 111 illustrated in FIG. 7 is outputted from the mode-locked laser 101. A light at a repetition frequency $f_m$ is outputted from the mode-locked laser 101.

A data signal to be transmitted via a transmission line is transmitted from an apparatus (not illustrated) to the optical intensity modulator 102. The optical intensity modulator 102 intensity-modulates the subcarrier light outputted from the mode-locked laser 101 by the data signal, and outputs the optical subcarrier modulated signal.

For example, the optical intensity modulator 102 outputs an optical subcarrier modulated signal like that indicated by a solid line of the waveform 113. A dashed line of the waveform 113 indicates the waveform of the data signal transmitted to the optical intensity modulator 102.

The optical subcarrier modulated signal outputted from the optical intensity modulator 102 is inputted to, for example, the optical multiplexer 22 illustrated in FIG. 3, and is combined with a carrier light. The optical subcarrier modulated signal is controlled so that the optical subcarrier modulated signal and the carrier light will have the same state of polarization. The optical subcarrier modulated signal is then combined with the carrier light.

The optical intensity modulator 102 is, for example, a lithium niobate optical modulator or an EA modulator. Alternatively, the optical intensity modulator 102 is a nonlinear optical medium. If the optical intensity modulator 102 is a nonlinear optical medium, then the optical intensity modulator 102 E/O-converts the data signal transmitted thereto, and intensity-modulates the subcarrier light outputted from the mode-locked laser 101 by the E/O-converted data signal. If the data signal transmitted to the optical intensity modulator 102 is an optical signal, then the optical intensity modulator 102 inputs it directly to the nonlinear optical medium and intensity-modulates the subcarrier light outputted from the mode-locked laser 101.

As has been described, the control light generator can generate a high-frequency optical subcarrier modulated signal by the use of the mode-locked laser on which a band limit based on a relaxation oscillation frequency of laser is not placed.

(Sixth Embodiment)

A sixth embodiment will now be described in detail with reference to the drawing. In the sixth embodiment a light source which generates a short pulse and an optical time division multiplexer are used for generating a subcarrier light. An optical network system according to the sixth embodiment is the same as that illustrated in FIG. 2, and its description will be omitted. In addition, an optical multiplexing apparatus is the same as that illustrated in FIG. 3 (but differs in the structure of a control light generator), and its description will be omitted.

Figure 8:
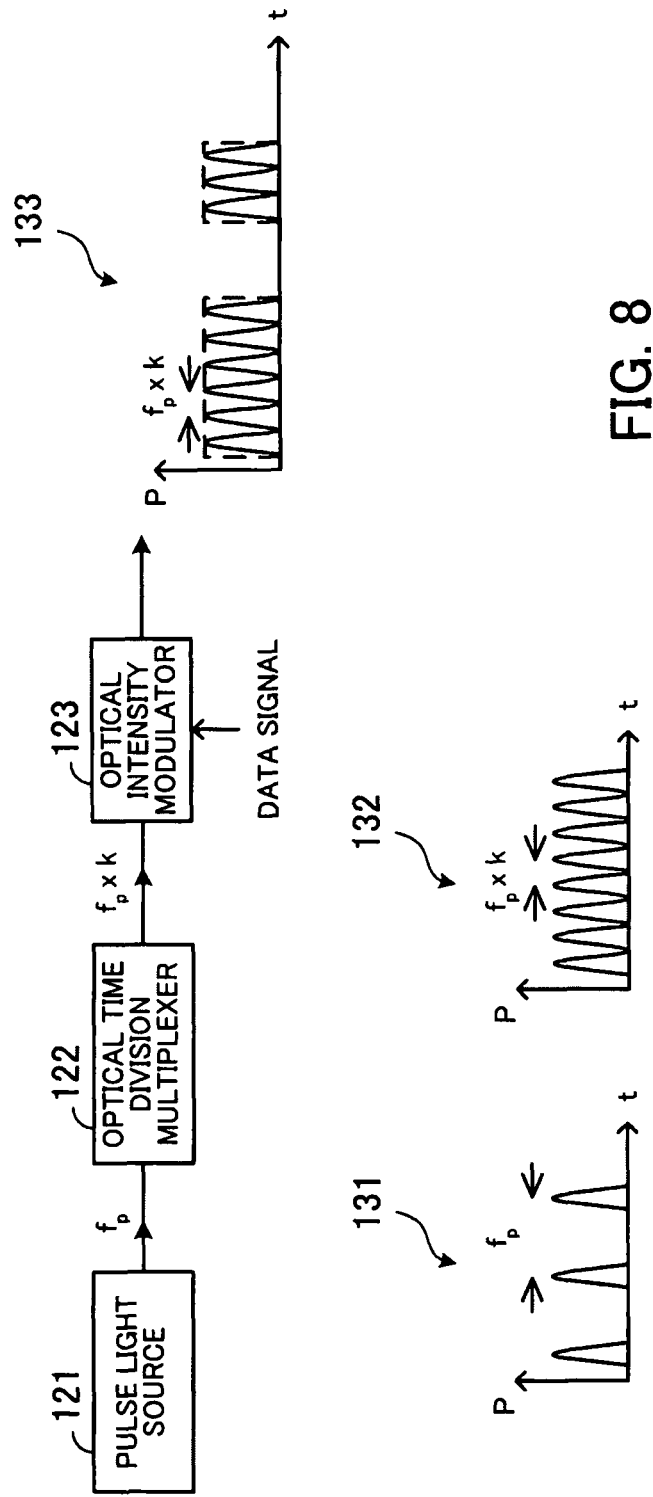
FIG. 8 is a block diagram of a control light generator according to a sixth embodiment.

FIG. 8 is a block diagram of the control light generator according to the sixth embodiment. As illustrated in FIG. 8, the control light generator includes a pulse light source 121, an optical time division multiplexer 122, and an optical intensity modulator 123.

A waveform 131 of a pulse light outputted from the pulse light source 121 is illustrated in FIG. 8. The horizontal axis and vertical axis of the waveform 131 indicate time and power respectively. In addition, a waveform 132 of a light outputted from the optical time division multiplexer 122 is illustrated in FIG. 8. The horizontal axis and vertical axis of the waveform 132 indicate time and power respectively. Furthermore, a waveform 133 of an optical subcarrier modulated signal outputted from the optical intensity modulator 123 is illustrated in FIG. 8. The horizontal axis and vertical axis of the waveform 133 indicate time and power respectively.

As indicated by the waveform 131, the pulse light source 121 outputs a pulse light at a repetition frequency $f_p$. The pulse light is a short pulse light and its width is sufficiently narrower than 1/(repetition frequency $f_p$).

The optical time division multiplexer 122 is a 1-to-k optical time division multiplexer. The optical time division multiplexer 122 frequency-converts the pulse light outputted from the pulse light source 121 to a repetition frequency $f_p \times k$ and outputs it. For example, the optical time division multiplexer 122 outputs a pulse light at the repetition frequency $f_p \times k$ like that indicated by the waveform 132.

A data signal to be transmitted via a transmission line is transmitted from an apparatus (not illustrated) to the optical intensity modulator 123. The optical intensity modulator 123 intensity-modulates the pulse light (subcarrier light) outputted from the optical time division multiplexer 122 by the data signal, and outputs the optical subcarrier modulated signal.

For example, the optical intensity modulator 123 outputs an optical subcarrier modulated signal like that indicated by a solid line of the waveform 133. A dashed line of the waveform 133 indicates the waveform of the data signal transmitted to the optical intensity modulator 123.

The optical subcarrier modulated signal outputted from the optical intensity modulator 123 is inputted to, for example, the optical multiplexer 22 illustrated in FIG. 3, and is combined with a carrier light. The optical subcarrier modulated signal is controlled so that the optical subcarrier modulated signal and the carrier light will have the same state of polarization. The optical subcarrier modulated signal is then combined with the carrier light.

The optical intensity modulator 123 is, for example, a lithium niobate optical modulator or an EA modulator. Alternatively, the optical intensity modulator 123 is a nonlinear optical medium. If the optical intensity modulator 123 is a nonlinear optical medium, then the optical intensity modulator 123 E/O-converts the data signal transmitted thereto, and intensity-modulates the subcarrier light outputted from the optical time division multiplexer 122 by the E/O-converted data signal. If the data signal transmitted to the optical intensity modulator 123 is an optical signal, then the optical intensity modulator 123 inputs it directly to the nonlinear optical medium and intensity-modulates the subcarrier light outputted from the optical time division multiplexer 122.

As has been described, the control light generator generates a pulse light, controls a repetition frequency (optical subcarrier frequency) by the optical time division multiplexer, and generates an optical subcarrier modulated signal.

(Seventh Embodiment)

A seventh embodiment will now be described in detail with reference to the drawing. In the seventh embodiment a receiving apparatus included in an optical network system will be described. The optical network system according to the seventh embodiment is the same as that illustrated in FIG. 2, and its description will be omitted.

Figure 9:
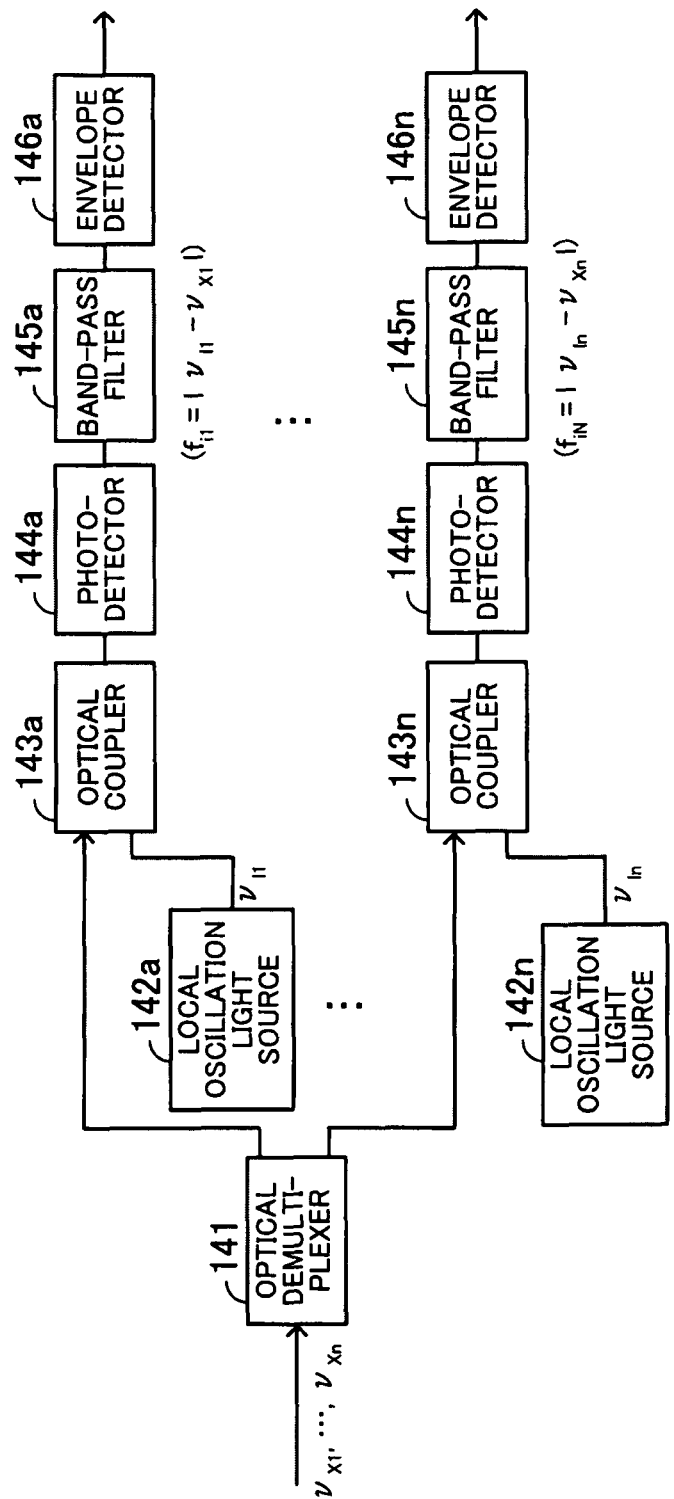
FIG. 9 is a block diagram of a receiving apparatus according to a seventh embodiment.

FIG. 9 is a block diagram of the receiving apparatus according to the seventh embodiment. As illustrated in FIG. 9, the receiving apparatus includes an optical demultiplexer 141, local oscillation light sources 142a, ..., and 142n, optical couplers 143a, ..., and 143n, photodetectors 144a, ..., and 144n, band-pass filters 145a, ..., and 145n, and envelope detectors 146a, ..., and 146n. The receiving apparatus illustrated in FIG. 9 performs down conversion by optical heterodyne detection and demodulates a data signal included in a carrier light.

The receiving apparatus illustrated in FIG. 9 corresponds to, for example, the receiving apparatus 12 illustrated in FIG. 2. A light which propagates along a transmission line is inputted to the receiving apparatus illustrated in FIG. 9. In FIG. 2, the receiving apparatus 12 is placed in the transmission line. For example, however, a part of the light which propagates along the transmission line may be made by an optical coupler or the like to branch, and be outputted to the receiving apparatus.

A carrier light which propagates along the transmission line is inputted to the optical demultiplexer 141. Lights at optical frequencies $v_{x1}, \ldots,$ and $v_{xn}$ are combined with the carrier light. Hereinafter the carrier light inputted to the optical demultiplexer 141 may be referred to as the multiplexed optical signal.

The optical frequencies $v_{x1}, \ldots,$ and $v_{xn}$ of the multiplexed optical signal correspond to, for example, the optical frequencies $v_{s1}, \ldots,$ and $v_{sn}$ of the CW lights outputted from the light sources 81b, ..., and 81n, respectively, described in FIG. 6, and are given by $$v_{xj} = v_c \pm |v_{cw} - v_{sj}| \quad (4)$$

where j is 1 to n (n is the number of the light sources 81b, ..., and 81n).

Alternatively, the difference f between the optical frequencies $v_1$ and $v_2$ of the CW lights outputted from the light sources 41a and 41b described in FIG. 4 differs among different optical multiplexing apparatus so that an optical subcarrier modulated signal and another optical subcarrier modulated signal combined with a carrier light will not overlap. For example, if a plurality of optical multiplexing apparatus each including the control light generator illustrated in FIG. 4 are placed in the transmission line, the plurality of optical multiplexing apparatus generate subcarrier lights at different optical subcarrier frequencies $f_1, \ldots,$ and $f_n$ and generate optical subcarrier modulated signals. The optical frequencies $v_{x1}, \ldots,$ and $v_{xn}$ of the multiplexed optical signal correspond to the optical subcarrier frequencies $f_1, \ldots,$ and $f_n$ of the lights generated by the plurality of optical multiplexing apparatus, and are given by $$v_{xj} = v_c \pm f_j \quad (5)$$

where j is 1 to n (n is the number of data signals multiplexed).

The same applies to an optical multiplexing apparatus including the control light generator described in FIG. 5, 7, or 8.

The optical demultiplexer 141 separates the multiplexed optical signal into n optical signal components and outputs them to the optical couplers 143a, ..., and 143n.

The local oscillation light sources 142a, ..., and 142n output lights at optical frequencies $v_{l1}$ and $v_{ln}$ respectively.

The n optical signal components into which the optical demultiplexer 141 separates the multiplexed optical signal and the lights outputted from the local oscillation light sources 142a, ..., and 142n are inputted to the optical couplers 143a, ..., and 143n. The optical couplers 143a, ..., and 143n combine the n optical signal components into which the optical demultiplexer 141 separates the multiplexed optical and the lights outputted from the local oscillation light sources 142a, ..., and 142n, and output lights obtained to the photodetectors 144a, ..., and 144n.

The photodetectors 144a, ..., and 144n convert the optical power of the lights outputted from the optical couplers 143a, ..., and 143n to electrical signals.

Each of the band-pass filters 145a, ..., and 145n extracts one signal component from an electrical signal outputted from the corresponding photodetector 144. Each of the band-pass filters 145a, ..., and 145n allows a signal component at a frequency given by the following expression (6) to pass, and removes signal components at redundant frequencies.

$$f_{ik} = |v_{lk} - v_{xk}| \quad (6)$$

where k is 1 to n (n is the number of data signals multiplexed).

A pass band for each of the band-pass filters 145a, ..., and 145n is set to, for example, the frequency $f_{ik}$ given by expression (6).

The envelope detectors 146a, ..., and 146n detect envelopes of the signal components outputted from the band-pass filters 145a, ..., and 145n respectively. By doing so, the receiving apparatus can obtain the data signals transmitted from an optical multiplexing apparatus.

As has been described, the receiving apparatus separates a carrier light into light components and combines the light components with lights outputted from the local oscillation light sources 142a, ..., and 142n. The receiving apparatus then converts the power of lights obtained to electrical signals by the photodetectors 144a, ..., and 144n, extracts signal components by the band-pass filters 145a, ..., and 145n, and detects envelopes of the signal components by the envelope detectors 146a, ..., and 146n. By doing so, data signals can be obtained.

(Eighth Embodiment)

An eighth embodiment will now be described in detail with reference to the drawing. In the eighth embodiment a receiving apparatus converts a multiplexed optical signal received to an electrical signal by a photodetector and divides it by a divider. The receiving apparatus then separates the electrical signals divided by band-pass filters. By doing so, data signals are obtained.

Figure 10:
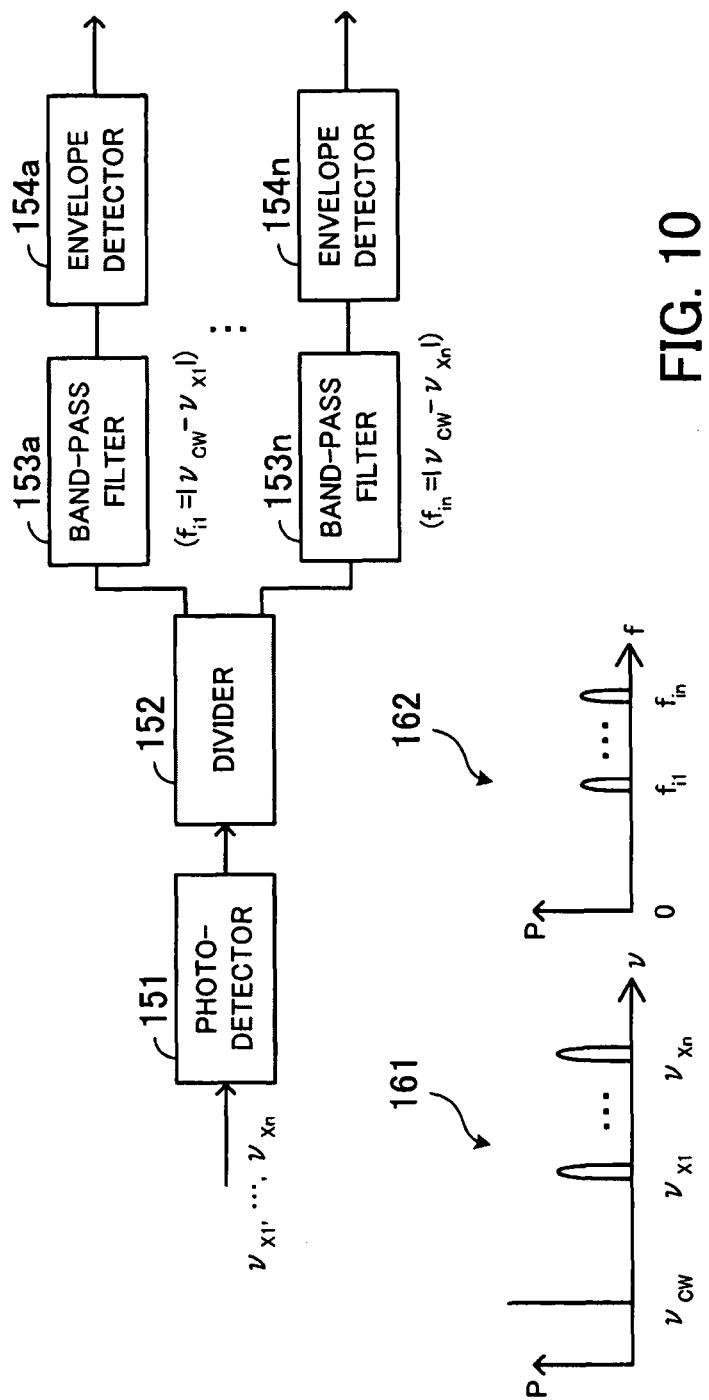
FIG. 10 is a block diagram of a receiving apparatus according to an eighth embodiment.

FIG. 10 is a block diagram of the receiving apparatus according to the eighth embodiment. As illustrated in FIG. 10, the receiving apparatus includes a photodetector 151, a divider 152, band-pass filters 153a, . . . , and 153n, and envelope detectors 154a, . . . , and 154n.

An optical spectrum 161 of a multiplexed optical signal inputted to the photodetector 151 is illustrated in FIG. 10. The horizontal axis and vertical axis of the optical spectrum 161 indicate an optical frequency and power respectively. In addition, an electrical spectrum 162 of a signal outputted from the photodetector 151 is illustrated in FIG. 10. The horizontal axis and vertical axis of the electrical spectrum 162 indicate a frequency and power respectively.

The multiplexed optical signal including optical frequencies indicated by the optical spectrum 161 is inputted to the photodetector 151. The photodetector 151 converts the optical power of the multiplexed optical signal inputted to an electrical signal. Accordingly, an electrical signal at frequencies indicated by the electrical spectrum 162 is outputted from the photodetector 151.

The divider 152 divides the electrical signal outputted from the photodetector 151 to the band-pass filters 153a, . . . , and 153n (n is the number of data signals multiplexed into the multiplexed optical signal).

Each of the band-pass filters 153a, . . . , and 153n allows a signal component at a frequency given by the following expression (7) to pass.

$$f_{ik} = |v_{cw} - v_{xk}| \quad (7)$$

where k is 1 to n (n is the number of data signals multiplexed).

That is to say, pass bands for the band-pass filters 153a, . . . , and 153n are set to the optical subcarrier frequencies of optical subcarrier modulated signals generated by a plurality of optical multiplexing apparatus. As a result, electrical signals to which the optical subcarrier modulated signals combined with a carrier light are converted are outputted from the band-pass filters 153a, . . . , and 153n.

The envelope detectors 154a, . . . , and 154n detect envelopes of the signals outputted from the band-pass filters 153a, . . . , and 153n. As a result, the receiving apparatus can obtain the data signals transmitted from the optical multiplexing apparatus.

As has been described, the receiving apparatus converts a carrier light to a electrical signal by the photodetector 151 and divides it to the band-pass filters 153a, . . . , and 153n. The receiving apparatus then extracts signal components at optical subcarrier frequencies from the electrical signals divided, and detects their envelopes. As a result, the receiving apparatus can obtain data signals.

(Ninth Embodiment)

A ninth embodiment will now be described in detail with reference to the drawing. In the ninth embodiment a receiving apparatus separates a multiplexed optical signal into signal components with determined wavelengths (at determined optical frequencies) by an optical demultiplexer, converts the signal components to electrical signals by photodetectors, and obtains data signals.

Figure 11:
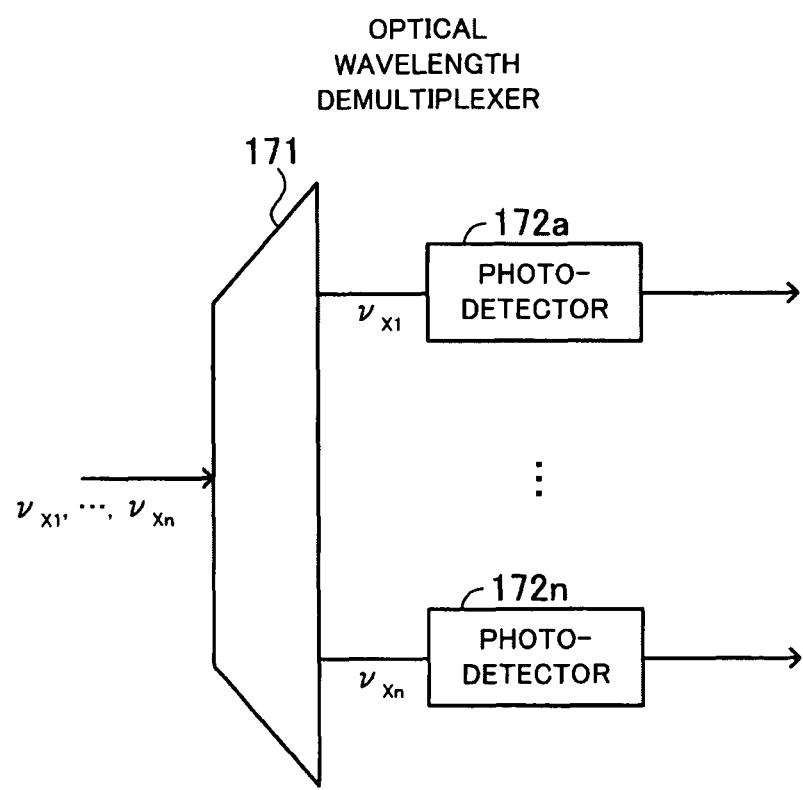
FIG. 11 is a block diagram of a receiving apparatus according to a ninth embodiment.

FIG. 11 is a block diagram of the receiving apparatus according to the ninth embodiment. As illustrated in FIG. 11, the receiving apparatus includes an optical wavelength demultiplexer 171 and photodetectors 172a, . . . , and 172n.

A multiplexed optical signal including optical frequencies $v_{x1}, \ldots, v_{xn}$ is inputted to the optical wavelength demultiplexer 171. The optical wavelength demultiplexer 171 separates the multiplexed optical signal into lights at the optical frequencies $v_{x1}, \ldots, v_{xn}$.

The photodetectors 172a, . . . , and 172n convert the optical power of the lights into which the optical wavelength demultiplexer 171 wavelength(optical-frequency)-demultiplexes the multiplexed optical signal to electrical signals. As a result, data signals transmitted from optical multiplexing apparatus are outputted from the photodetectors 172a, . . . , and 172n.

As has been described, the receiving apparatus separates a carrier light into light components at the optical frequencies $v_{x1}, \ldots, v_{xn}$ which are given by expression (5) and which correspond to the optical subcarrier frequencies $f_1, \ldots,$ and $f_n$ of optical subcarrier modulated signals generated by the optical multiplexing apparatus by the optical wavelength demultiplexer 171. The receiving apparatus then converts the optical power of the light components to electrical signals by the photodetectors 172a, . . . , and 172n. By doing so, data signals can be obtained.

(Tenth Embodiment)

A tenth embodiment will now be described in detail with reference to the drawing. In the tenth embodiment a receiving apparatus separates a multiplexed optical signal into light components at different optical frequencies which form groups by an optical wavelength demultiplexer, and down-converts each light component by optical heterodyne detection. The receiving apparatus divides each down-converted signal by a divider, separates divided signals by band-pass filters pass bands for which correspond to optical subcarrier frequencies, and performs detection by detectors. By doing so, data signals can be obtained.

Figure 12:
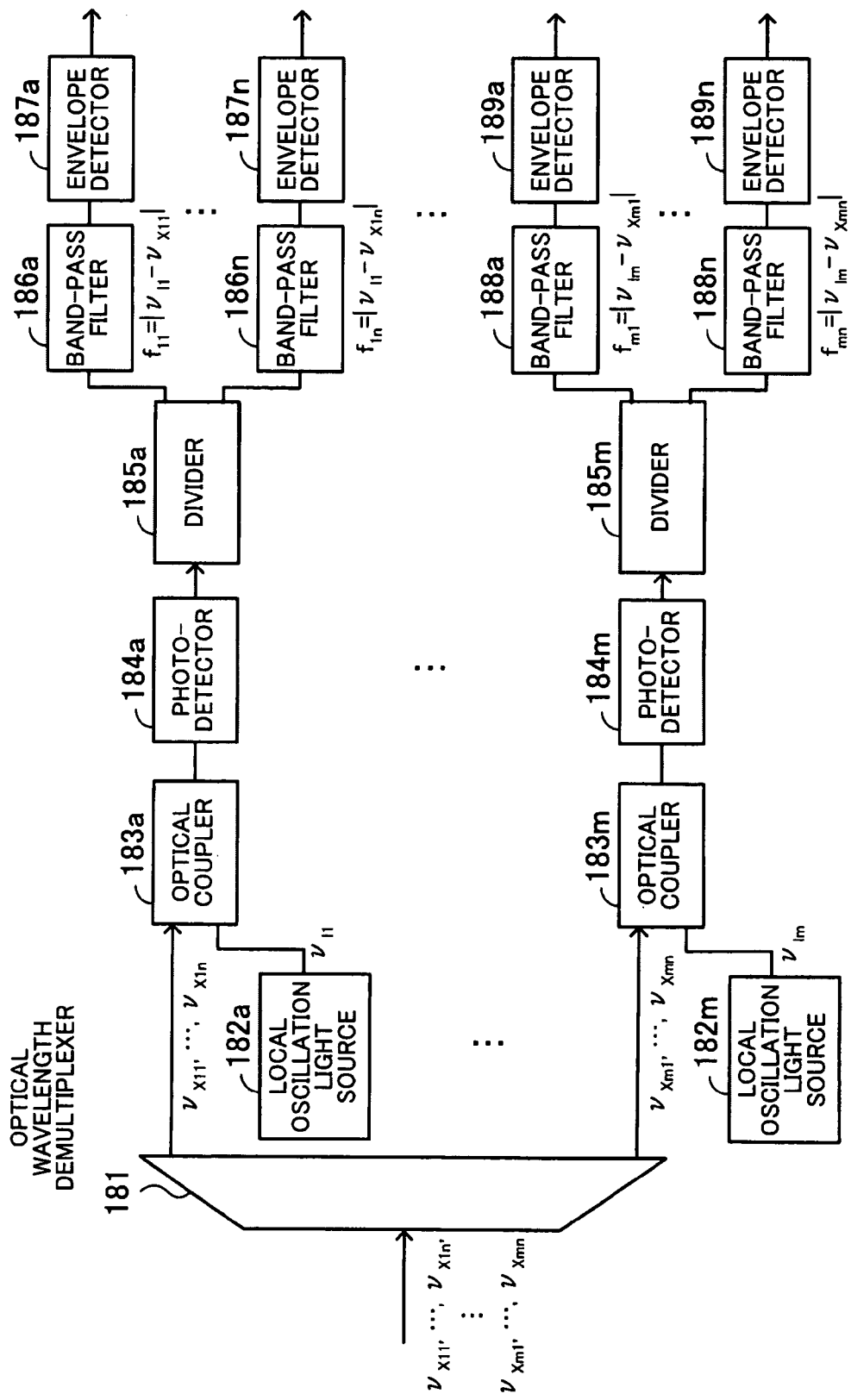
FIG. 12 is a block diagram of a receiving apparatus according to a tenth embodiment.

FIG. 12 is a block diagram of the receiving apparatus according to the tenth embodiment. As illustrated in FIG. 12, the receiving apparatus includes an optical wavelength demultiplexer 181, local oscillation light sources 182a, . . . , and 182m, optical couplers 183a, . . . , and 183m, photodetectors 184a, . . . , and 184m, dividers 185a, . . . , and 185m, band-pass filters 186a, . . . , 186n, . . . , 188a, . . . , and 188n, envelope detectors 187a, . . . , 187n, . . . , 189a, . . . , and 189n.

A multiplexed optical signal is separated into light components at different optical frequencies which form groups by the optical wavelength demultiplexer 181. The number of the local oscillation light sources 182a, . . . , and 182m, the number of the optical couplers 183a, . . . , and 183m, the number of the photodetectors 184a, . . . , and 184m, and the number of the dividers 185a, . . . , and 185m correspond to that of the optical frequency groups. The number of the band-pass filters 186a, . . . , and 186n corresponds to that of light components divided by the divider 185a (that of optical subcarrier modulated signals included in an optical frequency group). Similarly, the number of the band-pass filters 188a, . . . , and 188n corresponds to that of light components divided by the divider 185m. The envelope detectors 187a, . . . , 187n, . . . , 189a, . . . , and 189n correspond to the band-pass filters 186a, . . . , 186n, . . . , 188a, . . . , and 188n respectively.

A multiplexed optical signal including optical frequencies $v_{x11}, \ldots, v_{x1n}, \ldots, v_{xm1}, \ldots,$ and $v_{xmn}$ is inputted to the optical wavelength demultiplexer 181. Lights at optical frequencies $v_{x11}, \ldots,$ and $v_{x1n}$ are combined with a carrier light by, for example, optical multiplexing apparatus each including the control light generator illustrated in FIG. 6. Similarly, lights at optical frequencies $v_{xm1}, \ldots,$ and $v_{xmn}$ are combined with the carrier light by other optical multiplexing apparatus each including the control light generator illustrated in FIG. 6.

The optical wavelength demultiplexer 181 separates the multiplexed optical signal into light components at different optical frequencies which form groups. For example, the optical wavelength demultiplexer 181 separates light components at the optical frequencies $v_{x11}, \ldots,$ and $v_{x1n}$ from the multiplexed optical signal and outputs them to the optical coupler 183a. Similarly, the optical wavelength demultiplexer 181 separates light components at the optical frequencies $v_{xm1}, \ldots,$ and $v_{xmn}$ from the multiplexed optical signal and outputs them to the optical coupler 183m.

The local oscillation light sources 182a, . . . , and 182m output lights at optical frequencies $v_{11}, \ldots,$ and $v_{1m}$ respectively.

The light components into which the optical wavelength demultiplexer 181 separates the multiplexed optical signal and the lights outputted from the local oscillation light sources 182a, . . . , and 182m are inputted to the optical couplers 183a, . . . , and 183m respectively. The optical couplers 183a, . . . , and 183m combine the light components into which the optical wavelength demultiplexer 181 separates the multiplexed optical signal and the lights outputted from the local oscillation light sources 182a, . . . , and 182m, respectively, and output lights obtained to the photodetectors 184a, . . . , and 184m respectively.

The photodetectors 184a, . . . , and 184m convert the optical power of the lights outputted from the optical couplers 183a, . . . , and 183m, respectively, to electrical signals.

The dividers 185a, . . . , and 185m divide the electrical signals outputted from the photodetectors 184a, . . . , and 184m respectively. The number of signals divided by each of the dividers 185a, . . . , and 185m corresponds to that of optical subcarrier modulated signals included in each of the light components into which the optical wavelength demultiplexer 181 separates the multiplexed optical signal.

Each of the band-pass filters 186a, . . . , 186n, . . . , 188a, . . . , and 188n allows a signal at a frequency given by the following expression (8) to pass.

$$f_{jk} = |v_{1j} - v_{xjk}| \tag{8}$$

where j is 1 to m (m is the number of the local oscillation light sources 182a, . . . , and 182m) and k is 1 to n (n is the number of optical subcarrier modulated signals included in each of the light components into which the optical wavelength demultiplexer 181 separates the multiplexed optical signal).

That is to say, pass bands for the band-pass filters 186a, . . . , 186n, . . . , 188a, . . . , and 188n are set to frequencies corresponding to the difference between the optical frequencies of the lights outputted from the local oscillation light sources 182a, . . . , and 182m and the optical frequencies of lights outputted from the respective light sources of the plurality of optical multiplexing apparatus. In a word, pass bands for the band-pass filters 186a, . . . , 186n, . . . , 188a, . . . , and 188n are set to frequencies corresponding to optical subcarrier frequencies. As a result, electrical signals to which the optical subcarrier modulated signals combined with the carrier light are converted are outputted from the band-pass filters 186a, . . . , 186n, . . . , 188a, . . . , and 188n.

The envelope detectors 187a, . . . , 187n, . . . , 189a, . . . , and 189n detect envelopes of the signals outputted from the band-pass filters 186a, . . . , 186n, . . . , 188a, . . . , and 188n. As a result, the receiving apparatus can obtain data signals transmitted from the optical multiplexing apparatus.

As has been described, the receiving apparatus separates a multiplexed optical signal into light components at different frequencies which form groups by an optical wavelength demultiplexer, and down-converts each light component by optical heterodyne detection. The receiving apparatus then divides each down-converted signal by a divider, separates divided signals by band-pass filters pass bands for which correspond to optical subcarrier frequencies, and performs detection by detectors. By doing so, data signals can be obtained.

According to the system disclosed, information can be multiplex-transmitted in high density.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. An optical network system comprising:
    a transmission line along which a carrier light propagates; and
    an optical multiplexing apparatus placed in the transmission line,
    wherein the optical multiplexing apparatus includes:
        a first light source which outputs first light having a first optical frequency,
        a second light source which outputs second light having a second optical frequency,
        a modulator which intensity modulates the second light with a data signal,
        a first multiplexer which produces control light by combining the first light with the intensity-modulated second light supplied from the modulator, and
        a second multiplexer which combines the control light produced by the first multiplexer with the carrier light to modulate the carrier light with the control light in a nonlinear optical medium in the transmission line,
        wherein the first optical frequency and the second optical frequency have a difference corresponding to a beat frequency which the control light obtains as a result of the combining by the first multiplexer to produce the control light.

2. The optical network system according to claim 1, wherein:
    the optical multiplexing apparatus is provided in plurality; and
    the plurality of optical multiplexing apparatuses are configured to produce different beat frequencies and placed along the transmission line.

3. The optical network system according to claim 1 further comprising a receiving apparatus including:
    a demultiplexer which separates the carrier light;
    a plurality of local oscillation light sources which output local lights;
    a plurality of local light multiplexers which combine light components into which the demultiplexer separates the carrier light and the local lights outputted from the plurality of local oscillation light sources;
    a plurality of photodetectors which convert lights outputted from the plurality of local light multiplexers to electrical signals; and
    a plurality of filters each of which extracts one signal component from an electrical signal.

4. The optical network system according to claim 1 further comprising a receiving apparatus including:
    a photodetector which converts the carrier light to an electrical signal;

a divider which divides the electrical signal; and a plurality of filters which allow divided electrical signals at optical intensity frequencies of the intensity-modulated light to pass.

5. The optical network system according to claim 1 further comprising a receiving apparatus including:

a demultiplexer which separates the carrier light into light components at different optical frequencies; and a plurality of photodetectors which convert the light components outputted from the demultiplexer to electrical signals.

6. The optical network system according to claim 1 further comprising a receiving apparatus including:

a demultiplexer which separates the carrier light into light components at different optical frequencies which form groups;

a plurality of local oscillation light sources which output local lights;

a plurality of local light multiplexers which combine the light components into which the demultiplexer separates the carrier light and the local lights outputted from the plurality of local oscillation light sources;

a plurality of photodetectors which convert lights outputted from the plurality of local light multiplexers to electrical signals;

a plurality of dividers which divide the electrical signals; and a plurality of filters which allow divided electrical signals at frequencies corresponding to optical intensity frequencies of the intensity-modulated light to pass.

7. An optical multiplexing apparatus, comprising:

a first light source which outputs first light having a first optical frequency;

a second light source which outputs second light having a second optical frequency;

a modulator which intensity modulates the second light with a data signal;

a first multiplexer which produces control light by combining the first light with the intensity-modulated second light supplied from the modulator; and a second multiplexer which combines the control light produced by the first multiplexer with a carrier light entered to the optical multiplexing apparatus to modulate the carrier light with the control light in a nonlinear optical medium along which the carrier light propagates, wherein the first optical frequency and the second optical frequency have a difference corresponding to a beat frequency which the control light obtains as a result of the combining by the first multiplexer to produce the control light.

8. An optical multiplexing apparatus, comprising:

a first light source which outputs first light having a first optical frequency;

a plurality of second light sources which output second lights having second optical frequencies that are different from each other;

a plurality of modulators which intensity modulate the outputs of the plurality of second light sources respectively with a plurality of different data signals; and a first multiplexer which produces control light by combining the first light with the intensity-modulated outputs of the plurality of modulators individually; and a second multiplexer which combines the control light produced by the first multiplexer with a carrier light entered to the optical multiplexing apparatus to modulate the carrier light with the control light in a nonlinear optical medium along which the carrier light propagates, wherein the second optical frequencies have differences from the first optical frequency, the differences corresponding respectively to a plurality of different beat frequencies that the control light obtains as a result of the combining by the first multiplexer to produce the control light.

* * * * *